United States Patent
Kato et al.

(10) Patent No.: US 7,899,246 B2
(45) Date of Patent: Mar. 1, 2011

(54) IMAGE DISPLAY DEVICE, IMAGE DISPLAY METHOD, AND COMPUTER PRODUCT

(75) Inventors: Yoshinaga Kato, Kanagawa (JP);
Tetsuya Sakayori, Ohta-ku (JP);
Junichi Takami, Kanagawa (JP); Iwao Saeki, Kanagawa (JP); Takashi Yano, Ohta-ku (JP); Yoshifumi Sakuramata, Ohta-ku (JP); Hiroko Mano, Ohta-ku (JP); Bin Lu, Ohta-ku (JP)

(73) Assignee: Ricoh Company, Limited, Tokyo (JP)

( * ) Notice: Subject to any disclaimer, the term of this patent is extended or adjusted under 35 U.S.C. 154(b) by 790 days.

(21) Appl. No.: 11/506,810

(22) Filed: Aug. 21, 2006

(65) Prior Publication Data
US 2007/0070472 A1    Mar. 29, 2007

(30) Foreign Application Priority Data
Sep. 16, 2005   (JP) ................ 2005-269303
Oct. 13, 2005   (JP) ................ 2005-299294

(51) Int. Cl.
*G06K 9/34*       (2006.01)
*G06F 3/041*      (2006.01)
(52) U.S. Cl. .................. 382/173; 345/173
(58) Field of Classification Search .......... 382/173; 178/18.01; 345/173
See application file for complete search history.

(56) References Cited

U.S. PATENT DOCUMENTS

| | | | | |
|---|---|---|---|---|
| 5,548,700 | A * | 8/1996 | Bagley et al. | 715/255 |
| 6,836,759 | B1 * | 12/2004 | Williamson et al. | 704/235 |
| 7,453,439 | B1 * | 11/2008 | Kushler et al. | 345/168 |
| 2003/0101425 | A1 * | 5/2003 | Makinen | 716/11 |
| 2003/0197744 | A1 * | 10/2003 | Irvine | 345/856 |
| 2003/0209599 | A1 * | 11/2003 | Gatto | 235/379 |
| 2003/0218642 | A1 | 11/2003 | Sakayori et al. | |
| 2004/0017941 | A1 * | 1/2004 | Simske | 382/180 |
| 2004/0021644 | A1 | 2/2004 | Enomoto | |
| 2004/0130537 | A1 * | 7/2004 | Kong et al. | 345/173 |
| 2004/0174399 | A1 | 9/2004 | Wu et al. | |
| 2004/0247206 | A1 | 12/2004 | Kaneda et al. | |

(Continued)

FOREIGN PATENT DOCUMENTS

| | | |
|---|---|---|
| EP | 1 455 284 | 9/2004 |
| EP | 1538829 A1 * | 6/2005 |
| JP | 9-91450 | 4/1997 |

(Continued)

OTHER PUBLICATIONS

Extended European Search Report issued for EP 06 25 4824 dated Aug. 19, 2010.

*Primary Examiner* — Bhavesh M Mehta
*Assistant Examiner* — Nirav G Patel
(74) *Attorney, Agent, or Firm* — Oblon, Spivak, McClelland, Maier & Neustadt, L.L.P.

(57) ABSTRACT

An image display device includes an analyzing section that analyzes the types of images contained in input image data, a dividing section that divides the image data into blocks based on the types of images, a display controlling section that displays the image data divided into the blocks on a touch panel, a specifying section that specifies a block as selected or non-selected block, and an editing section that edit a selected block in response to an edit request. The display controlling section displays an image edited by the editing section on a display screen.

3 Claims, 22 Drawing Sheets

U.S. PATENT DOCUMENTS

| | | | |
|---|---|---|---|
| 2005/0128527 A1* | 6/2005 | Brawn et al. | 358/401 |
| 2005/0198591 A1* | 9/2005 | Jarrett et al. | 715/863 |
| 2005/0246604 A1 | 11/2005 | Fujimoto et al. | |
| 2006/0077182 A1* | 4/2006 | Studt | 345/173 |

FOREIGN PATENT DOCUMENTS

| | | |
|---|---|---|
| JP | 2001-94760 | 4/2001 |
| JP | 2006-3568 | 1/2006 |

* cited by examiner

| NO. | AREA | SEL_STATUS | IMAGE DATA |
|---|---|---|---|
| 1 | (5, 10, 20, 5) | NOSEL | pic 0001 |
| 2 | ... | NOSEL | pic 0002 |
| 3 | ... | NOSEL | pic 0003 |
| 4 | ... | NOSEL | pic 0004 |
| 5 | (10, 17, 70, 10) | NOSEL | pic 0005 |
| ... | ... | ... | ... |
| 10 | (45, 32, 34, 50) | NOSEL | pic 0010 |
| ... | ... | ... | ... |
| 13 | (50, 121, 35, 6) | NOSEL | pic 0013 |

| NO. | AREA | SEL_STATUS | IMAGE DATA |
|---|---|---|---|
| 1 | (5, 10, 20, 5) | SEL | pic 0001 |
| 2 | ... | SEL | pic 0002 |
| 3 | ... | SEL | pic 0003 |
| 4 | ... | SEL | pic 0004 |
| 5 | (10, 17, 70, 10) | NOSEL | pic 0005 |
| ... | ... | ... | ... |
| 10 | (45, 32, 34, 50) | NOSEL | pic 0010 |
| ... | ... | ... | ... |
| 13 | (50, 121, 35, 6) | NOSEL | pic 0013 |

FIG. 8

| NO. | AREA | SEL_STATUS | IMAGE DATA |
|---|---|---|---|
| 1 | (5, 10, 20, 5) | DEL | pic 0001 |
| 2 | ... | DEL | pic 0002 |
| 3 | ... | DEL | pic 0003 |
| 4 | ... | DEL | pic 0004 |
| 5 | (10, 17, 70, 10) | NOSEL | pic 0005 |
| ... | ... | ... | ... |
| 10 | (45, 32, 34, 50) | NOSEL | pic 0010 |
| ... | ... | ... | ... |
| 13 | (50, 121, 35, 6) | NOSEL | pic 0013 |

FIG. 11

| NO. | AREA | SEL_STATUS | IMAGE DATA |
|---|---|---|---|
| 1 | (5, 10, 20, 5) | SEL | pic 0001 |
| 2 | ... | SEL | pic 0002 |
| 3 | ... | SEL | pic 0003 |
| 4 | ... | SEL | pic 0004 |
| 5 | (10, 17, 70, 10) | SEL | pic 0005 |
| ... | ... | ... | ... |
| 10 | (45, 32, 34, 50) | NOSEL | pic 0010 |
| ... | ... | ... | ... |
| 13 | (50, 121, 35, 6) | NOSEL | pic 0013 |

FIG. 13

| NO. | AREA | SEL_STATUS | IMAGE DATA |
|---|---|---|---|
| 1 | (5, 10, 20, 5) | NOSEL | pic 0001 |
| 2 | ... | NOSEL | pic 0002 |
| 3 | ... | NOSEL | pic 0003 |
| 4 | ... | NOSEL | pic 0004 |
| 5 | (10, 17, 70, 10) | NOSEL | pic 0005 |
| ... | ... | ... | ... |
| 10 | (45, 32, 34, 50) | NOSEL | pic 0010 |
| ... | ... | ... | ... |
| 13 | (50, 121, 35, 6) | SEL | pic 0013 |

| NO. | AREA | SEL_STATUS | IMAGE DATA |
|---|---|---|---|
| 1 | (5, 10, 20, 5) | NOSEL | pic 0001 |
| 2 | ... | NOSEL | pic 0002 |
| 3 | ... | NOSEL | pic 0003 |
| 4 | ... | NOSEL | pic 0004 |
| 5 | (10, 17, 70, 10) | NOSEL | pic 0005 |
| ... | ... | ... | ... |
| 10 | (45, 32, 34, 50) | NOSEL | pic 0010 |
| ... | ... | ... | ... |
| 13 | (50, 3, 35, 6) | NOSEL | pic 0013 |

| NO. | AREA | SEL_STATUS | IMAGE DATA |
|---|---|---|---|
| 1 | (5, 10, 20, 5) | NOSEL | pic 0001 |
| 2 | ... | NOSEL | pic 0002 |
| 3 | ... | NOSEL | pic 0003 |
| 4 | ... | NOSEL | pic 0004 |
| 5 | (10, 17, 70, 10) | SEL | pic 0005 |
| ... | ... | ... | ... |
| 10 | (45, 32, 34, 50) | NOSEL | pic 0010 |
| ... | ... | ... | ... |
| 13 | (50, 121, 35, 6) | NOSEL | pic 0013 |

1801

IMAGE DISPLAY DEVICE, IMAGE DISPLAY METHOD, AND COMPUTER PRODUCT

CROSS-REFERENCE TO RELATED APPLICATIONS

The present document incorporates by reference the entire contents of Japanese priority documents, 2005-269303 filed in Japan on Sep. 16, 2005 and 2005-299294 filed in Japan on Oct. 13, 2005.

BACKGROUND OF THE INVENTION

1. Field of the Invention

The present invention relates to an image display device, an image display method, and a computer product.

2. Description of the Related Art

With a conventional image forming apparatus such as a digital multifunction product (MFP), a user has difficulties in performing editing operation, such as layout work, for an image while checking operational settings and a status of an output image. When the user wishes to print only photos and graphics in an image, the user has to go through the cumbersome steps of, for example, making a copy of the image, cutting photos and graphics out of the image, pasting the photos and the graphics on another sheet, and then making a copy of the sheet.

In view of the foregoing, Japanese Patent Laid-Open Publication No. 2001-94760 discloses an information processor. The conventional information processor divides read image data into blocks so that a user can specify a block to be modified, and prints the image data after modification. The conventional information processor makes it possible to edit text information in a specific block or the size of the block.

However, with the conventional information processor, a user cannot select a plurality of blocks to be moved or deleted to change the entire layout of an image. That is, although the information processor allows a user to correct illegible part of text in image data and print the image data reflecting the correction, the user cannot print, for example, only photos and graphics in an original image.

SUMMARY OF THE INVENTION

It is an object of the present invention to at least partially solve the problems in the conventional technology.

According to an aspect of the present invention, an image display method includes analyzing first image data to detect types of images contained therein, the types of images including a text image, a photo image, and a graphic image, dividing the first image data into a plurality of blocks based on the types of images to obtain second image data, displaying the second image data on a display screen, specifying at least one of the blocks as a first selected block, receiving an edit request for the first selected block, the edit request containing at least one of commands that include delete, move, enlarge, and shrink, editing the first selected block in response to the edit request to obtain third image data, and displaying the third image data together with any one of the first image data and the second image data.

According to another aspect of the present invention, an image display device includes an analyzing unit that analyzes first image data to detect types of images contained therein, the types of images including a text image, a photo image, and a graphic image, a dividing unit that divides the first image data into blocks based on the types of images to obtain second image data, a display screen that displays the second image data, a specifying unit that specifies at least one of the blocks as a first selected block, an editing unit that receives an edit request for the first selected block, and edits the first selected block in response to the edit request to obtain third image data, the edit request containing at least one of commands that include delete, move, enlarge, and shrink, and a display controlling unit that displays the third image data together with any one of the first image data and the second image data on the display screen.

According to still another aspect of the present invention, a computer program product includes a computer program that implements the above methods on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram of a data structure of the divided image shown in FIG. 5;

FIG. 8 is a diagram of a data structure of the divided image shown in FIG. 7;

FIG. 11 is a diagram of a data structure of the divided image shown in FIG. 10;

FIG. 13 is a diagram of a data structure of the divided image shown in FIG. 12;

FIG. 15 is a diagram of a data structure of the divided image shown in FIG. 14;

FIG. 17 is a diagram of a data structure of the divided image shown in FIG. 16;

DETAILED DESCRIPTION OF THE PREFERRED EMBODIMENTS

Exemplary embodiments of the present invention are described in detail below with reference to the accompanying drawings.

According to a first embodiment of the present invention, an image display device analyzes read image data, and divides the image data into blocks based on image types. When a user selects one of the blocks, the image display device edits the block according to conditions and parameters specified by the user, and displays the image. Namely, the image display device divides an image into blocks. The image is edited swiftly per unit of block by a simple and selective operation from a visual interface, such as a touch panel, generally attached to electronic equipment. The image display device displays the edited image on a display screen.

Figure 1:
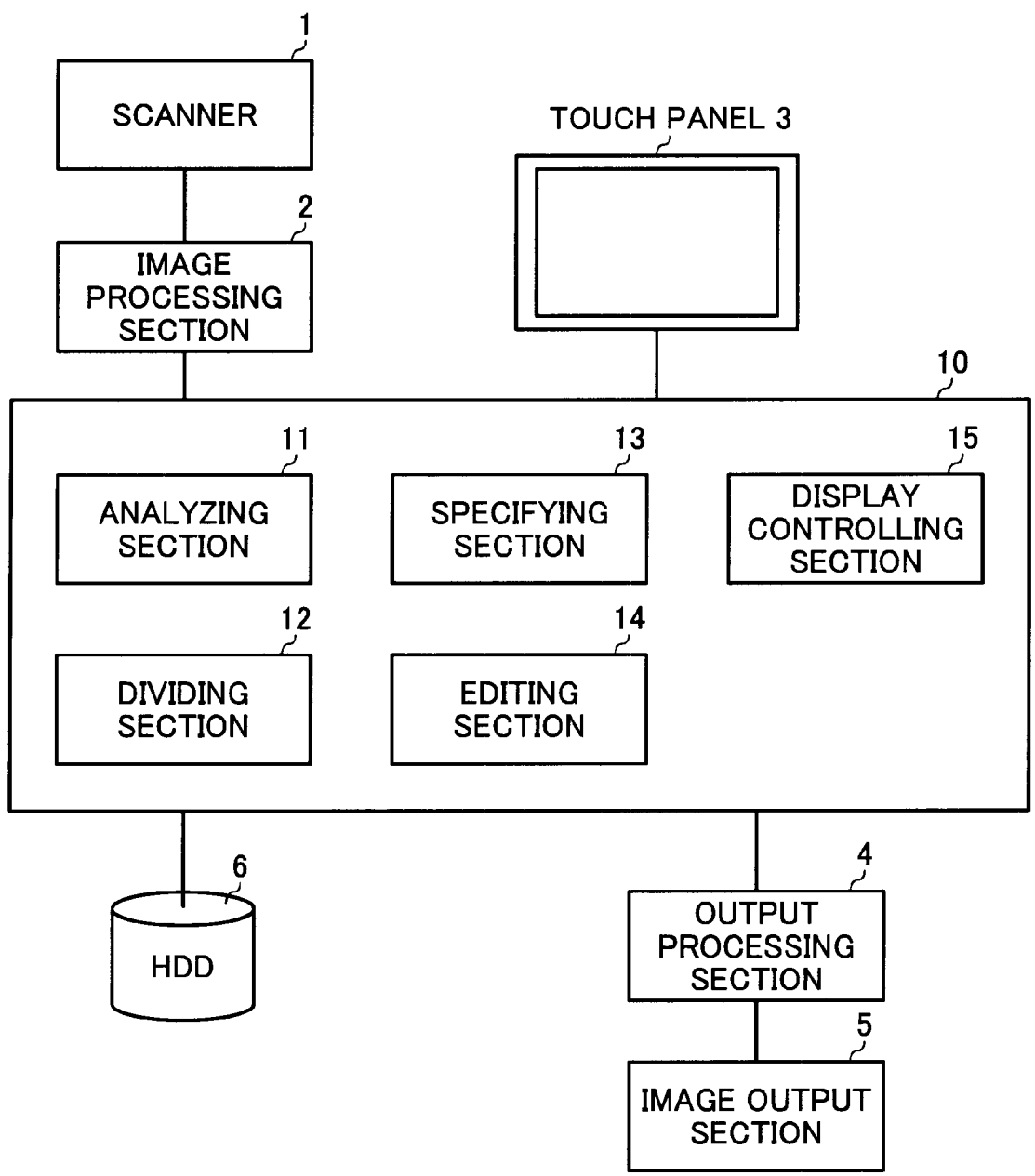
FIG. 1 is a functional block diagram of an image forming apparatus including an image display device according to a first embodiment of the present invention.

FIG. 1 is a functional block diagram of an image forming apparatus according to the first embodiment. The image forming apparatus includes a scanner 1, an image processing section 2, a touch panel 3, an output processing section 4, an image output section 5, a memory (Hard Disk Drive (HDD)) 6, and an image display device 10.

The scanner 1 reads an image. The image processing section 2 converts the image into digital data to generate image data, and sends the image data to the image display device 10. The touch panel 3 is used by a user to, for example, specify a block of the image, and set various conditions and parameters for editing and printing. The touch panel 3 displays the original image read by the scanner 1, and also the image edited according to input on the touch panel 3.

The user can perform input operation by touching the touch panel 3 with his/her finger, a stylus pen, or other pointing devices. The touch panel 3 detects the location of a touched point on a panel screen by known techniques such as the resistive film method for detecting a resistance change due to touch by a finger or a stylus pen, the infrared sensing method, or the analog capacity coupling method. As an input method, the contact input is generally used.

In the following description, contact input (hereinafter "touch input") on the touch panel 3 is taken as an example; however, the input method is not limited to the touch input. For example, the image forming apparatus can include an input device (not shown), such as a mouse or a keyboard, by which the user performs input operation. Further, the operating unit can include a push-button to instruct printing.

The image display device 10 processes or edits the image data received from the image processing section 2 based on conditions and parameters input through the touch panel 3. The touch panel 3 displays the edited image on the display screen.

The output processing section 4 performs an output process for the edited image data from the image display device 10, and sends the image data to the image output section 5. The image output section 5 prints the image data.

The image display device 10 includes an analyzing section 11, a dividing section 12, a specifying section 13, an editing section 14, and a display controlling section 15. The analyzing section 11 analyzes input image data to detect the presence or absence of an edge area, a difference in gray levels or pixel values, and the number of halftone pixels. The analyzing section 11 then determines types of images contained in the image data. Examples of the image types include a text image, a photo image, and a graphic image. The analyzing technique is known, and is not described herein.

The dividing section 12 divides the image data into blocks according to the image types based on the results of analysis obtained by the analyzing section 11. For example, when the image data is a text image, the image data is divided by each paragraph. When the image data contains photo images and graphic images, the image data is divided with respect to each photo image and graphic image. The dividing section 12 stores the image data divided into blocks on the HDD 6 as a divided image file.

The dividing section 12 determines part of the image data as a text block by, for example, detecting a string of letters or characters. The dividing section 12 also extracts part of the image data as a photo block by detecting a string of halftone pixels. Besides, the dividing section 12 determines part of the image data as a graphic block by detecting an edge portion and the substantial difference in gray levels. The dividing section 12 determines that another part of the image data is not any one of a text image, a photo image, and a graphic image, and performs a division process for the part. The technique for dividing an image into blocks is known, and is not described herein.

The specifying section 13 specifies a block that the user selects by touch input as a selected block. Specifically, when the user touches any point in a specific block displayed on the touch panel 3 with his/her finger, a stylus pen, etc., the specifying section 13 detects the coordinates of the location of the point. Having determined that the point is located inside a block, the specifying section 13 specifies the block as a selected block.

The specifying section 13 writes information indicating a selection status of the selected block to the image data. Examples of the selection status include: selected, non-selected, and non-displayed. The display controlling section 15 displays a block on the touch panel 3 according to the selection status of the block specified in the specifying section 13.

The editing section 14 receives an edit request (signal). The edit request contains conditions and parameters for editing. The editing section 14 edits a block obtained by the dividing section 12 and specified by the specifying section 13 according to the conditions and parameters. The conditions and parameters indicate to move, delete, etc. the selected block. For example, when the user presses a delete key or a delete icon on the touch panel 3, the editing section 14 deletes the selected block.

The editing section 14 edits a selected block of image data for which an edit request has been received, and outputs the image data to the display controlling section 15. The editing section 14 outputs image data, for which no edit request has been made, to the display controlling section 15 without edition.

For example, when a photo block and a graphic block of read image data are selected to be deleted, the editing section 14 deletes the selected blocks. Accordingly, only text is displayed on the screen so that the user can check the contents of the text before printing the image data. The user can delete a desired block of image data by, for example, touching the delete icon on the display screen.

The display controlling section 15 displays an image edited by the editing section 14 on the touch panel 3. With the edited image, the display controlling section 15 displays a selection status of each block and items specifying print format on the touch panel 3. When a print key is pressed, the output processing section 4 performs an output process for the edited image data, and the image output section 5 prints out the edited image.

The display controlling section 15 stores image data divided into blocks by the dividing section 12 on the HDD 6. Besides, the display controlling section 15 updates the divided image data stored on the HDD 6, information on a layout of the blocks, and information associated with the blocks, such as selection statuses of the blocks: selected, non-selected, or non-displayed, and then stores the updated image data on the HDD 6.

Figure 2:
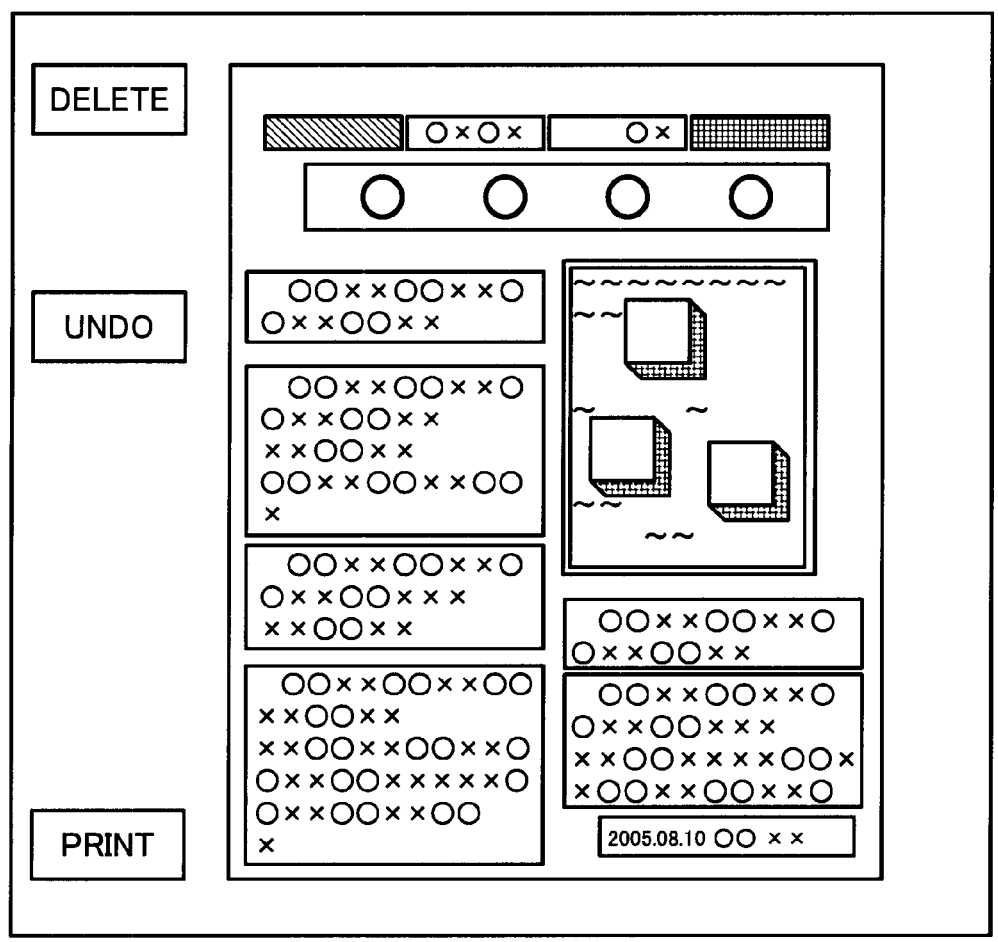
FIG. 2 is an example of a divided image displayed by the image display device shown in FIG. 1.

FIG. 2 is a diagram of an example of a divided image displayed by image display device 10. In FIG. 2, read original image is divided into blocks based on categories of contents such as paragraphs, a title, and a photo. Each block is defined by a solid line in a rectangle frame. The solid line is cited by way of example and without limitation, and a block can be defined by a colored frame, for example, a frame formed of a blue solid line.

Figures 3, 4:
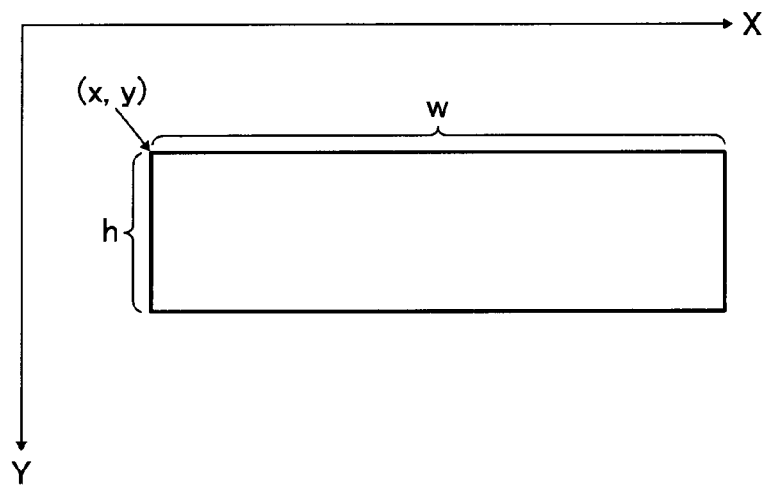
FIG. 3 is a diagram of a data structure of the divided image shown in FIG. 2.
FIG. 4 is a diagram for explaining coordinate data that defines the position of a block.

FIG. 3 is a diagram of a data structure of a divided image. FIG. 4 is a diagram for explaining coordinate data that defines the position of a block. The data structure in FIG. 3 defines the image shown in FIG. 2. The display controlling section 15 reads the data in FIG. 3, and displays the image shown in FIG. 2.

In FIG. 3, No. (represented by the reference numeral 301) indicates a block number assigned to each block obtained by the dividing section 12. In the example of FIG. 3, image data is divided into 13 blocks, and numbers from 1 to 13 is assigned to the blocks, respectively. AREA (represented by the reference numeral 302) indicates coordinates data for the position of each block. The coordinate data is represented by values on coordinate axes, an X-axis and a Y-axis, on the touch panel 3.

The X-axis and a Y-axis are set as shown in FIG. 4. In the image forming apparatus, the X-axis and the Y-axis are preferably set in the main scanning direction and the sub-scanning direction, respectively. A group of four parameters (x, y, w, and h) defines the size and position of a rectangle frame. The parameters x, y, w, and h herein represent the origin of the X-coordinate axis, the origin of the Y-coordinate axis, the width in the X-axis direction, and the height in the Y-axis direction, respectively.

SEL_STATUS (represented by the reference numeral 303) indicates a selection status associated with each block. Selection statuses: selected, non-selected, and non-displayed, are represented by SEL, NOSEL, and DEL, respectively. Immediately after an image is input and no block is selected yet, SEL_STATUS for every element is NOSEL.

IMAGE DATA (represented by the reference numeral 304) indicates specific image data in each block, namely block image data.

The specifying section 13 accepts input for specifying a selection status of a block through the touch panel 3. A block defined by a rectangle frame displayed on the touch panel 3 is selectable, and can be newly selected, additionally selected, or released from selection. When input is made via a block on the touch panel 3, the specifying section 13 sets a selection status of the block corresponding to the input.

The display controlling section 15 updates an image file according to the selection status accepted in the specifying section 13. Namely, the display controlling section 15 updates SEL_STATUS (303) corresponding to the block number (301) of a block based on the selection status. The display controlling section 15 displays image again on the touch panel 3 according to the updated image file. When the selection status of the block is changed, the block is displayed in the changed selection status.

Figure 5:
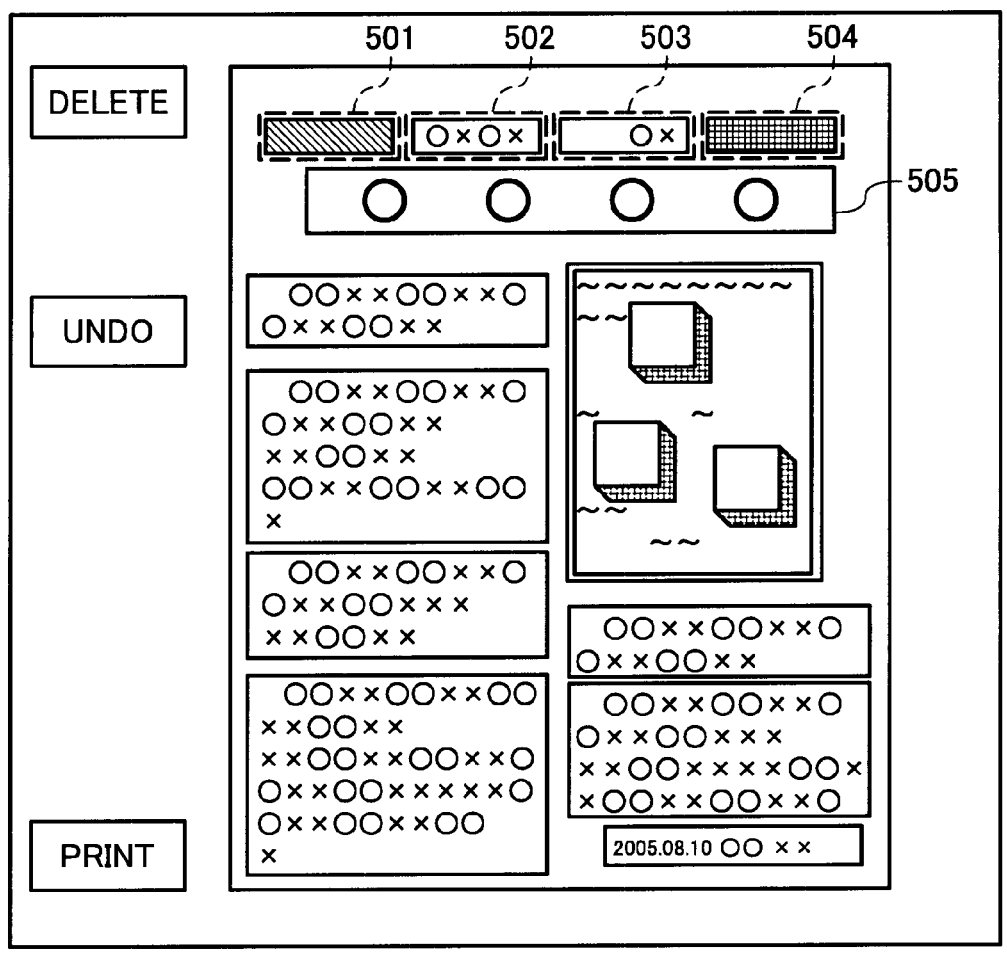
FIG. 5 is a diagram of an example of a divided image in which blocks are selected.

FIG. 5 is an example of a divided image in which blocks are selected. FIG. 6 is a diagram of a data structure of the divided image. When the user touches blocks 501 to 504 to select them, the specifying section 13 generates data 600 of FIG. 6 from data 300 of FIG. 3, in which SEL_STATUS of blocks No. 1 to No. 4 is updated from NOSEL to SEL. The display controlling section 15 displays the image where the selected blocks 501 to 504 is defined by a bold dotted line in a rectangle frame as shown in FIG. 5 according to the generated data 600.

Figure 7:
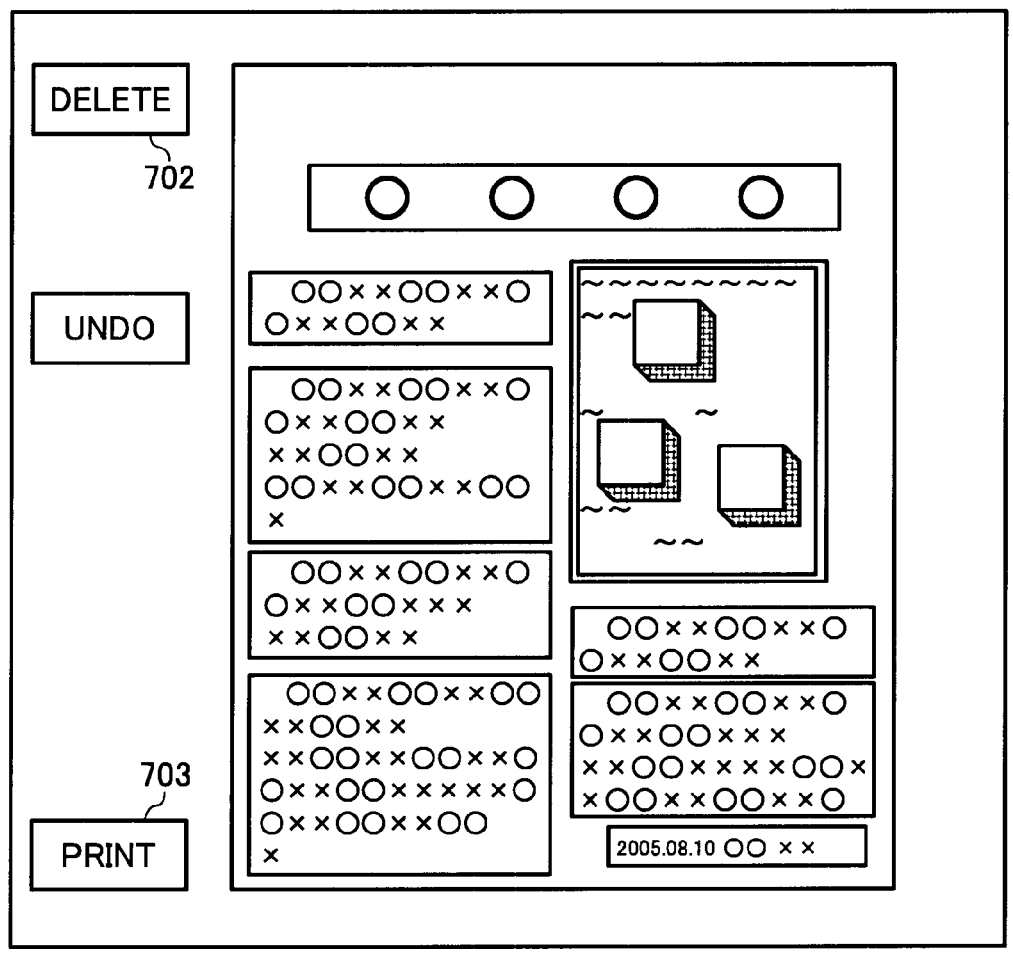
FIG. 7 is a diagram of an example of a divided image in which selected blocks are deleted.

FIG. 7 is a diagram of an example of a divided image in which selected blocks are deleted. FIG. 8 is a diagram of a data structure of the divided image. When a delete key 702 as shown in FIG. 7 is pressed, the editing section 14 deletes a selected block. The editing section 14 updates SEL_STATUS of the block from SEL to DEL (represented by the reference numeral 801).

The editing section 14 updates SEL_STATUS of the selected blocks No. 1 to No. 4 from SEL to DEL such that the data 600 of FIG. 6 changes to data 800 of FIG. 8. The display controlling section 15 displays, as shown in FIG. 7, the image where the blocks 501 to 504 selected in FIG. 5 are deleted according to data 800.

When a print key 703 on the touch panel 3 is pressed, the output processing section 4 accepts a print command, and performs an output process for the image data edited in the editing section 14 so that the image output section 5 prints the image in the print format displayed on the touch panel 3.

Figure 9:
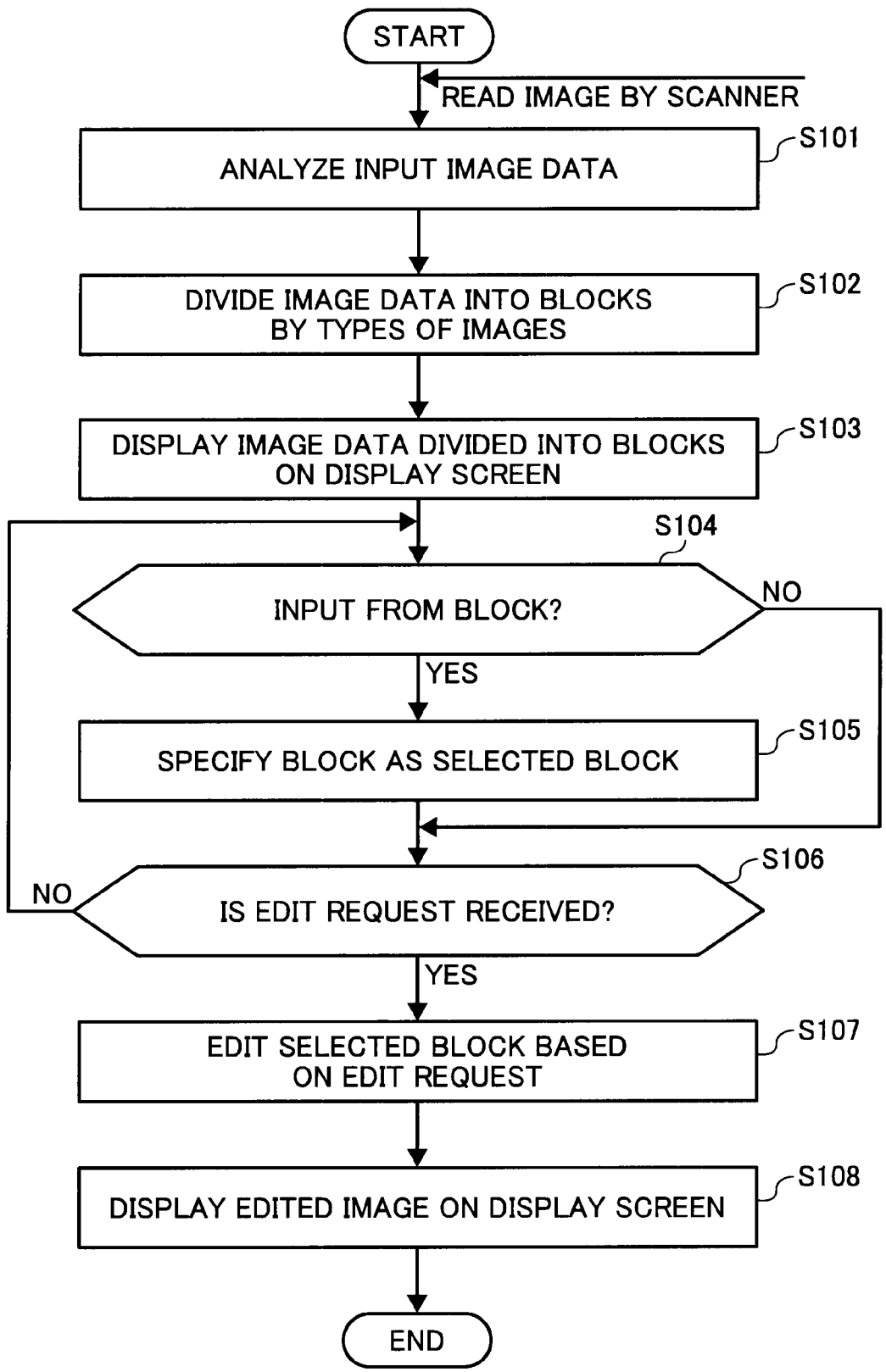
FIG. 9 is a flowchart of the operation of the image forming apparatus shown in FIG. 1.

FIG. 9 is a flowchart of the operation of the image forming apparatus. The scanner 1 reads an image, and the image processing section 2 generates image data form the image. The analyzing section 11 analyzes the image data to determine types of images contained in the image data. The types of images can be determined by known techniques. For example, by detecting an edge portion, a string of halftone pixels, and a difference in gray levels or pixel values, an image is determined as a text image, a photo image, a graphic image, or other images (step S101).

The dividing section 12 divides the image data into blocks by the types of images analyzed by the analyzing section 11. The image data is divided by the known techniques, for example, by detecting a string of letters or characters, a string of halftone pixels, an edge portion, and the difference in gray levels (step S102).

The display controlling section 15 generates image data of blocks obtained by the dividing section 12, and stores the image data on the HDD 6 as well as displaying the generated image data on the touch panel 3 (step S103).

The specifying section 13 detects input to select a block through the block (step S104). When the specifying section 13 detects touch input (Yes at step S104), the specifying section 13 specifies the block as a selected block. For example, when the blocks 501 to 504 in FIG. 5 are selected, SEL_STATUS of the blocks 501 to 504 is rewritten to SEL as shown in FIG. 6 (step S105). When the specifying section 13 does not detect any touch input (No at step S104), the process proceeds to step S106.

The editing section 14 determines whether an edit request is received for the selected block (step S106). Having determined that an edit request has been received, for example, that the delete key 702 in FIG. 7 is pressed (Yes at step S106), the editing section 14 deletes the selected block according to the edit request. Then, the editing section 14 updates SEL_STA- TUS of the selected block to DEL representing deletion as indicated by the reference numeral 801 in FIG. 8 (step S107).

When the editing section 14 receives no edit request for the selected block (No at step S106), the process returns to the step S104, and the specifying section 13 detects an input to select a block through the block. Thus, an additional selection is available.

When an edit request is received for a non-selected block, or a block that was once selected but the selection has been canceled, SEL_STATUS of the block is not changed, and any editing is not performed at step S107.

The display controlling section 15 displays on the touch panel 3 the image edited by the editing section 14, i.e., the image in which the blocks 501 to 504 are deleted and not displayed as shown in FIG. 7 (step S108).

Figure 10:
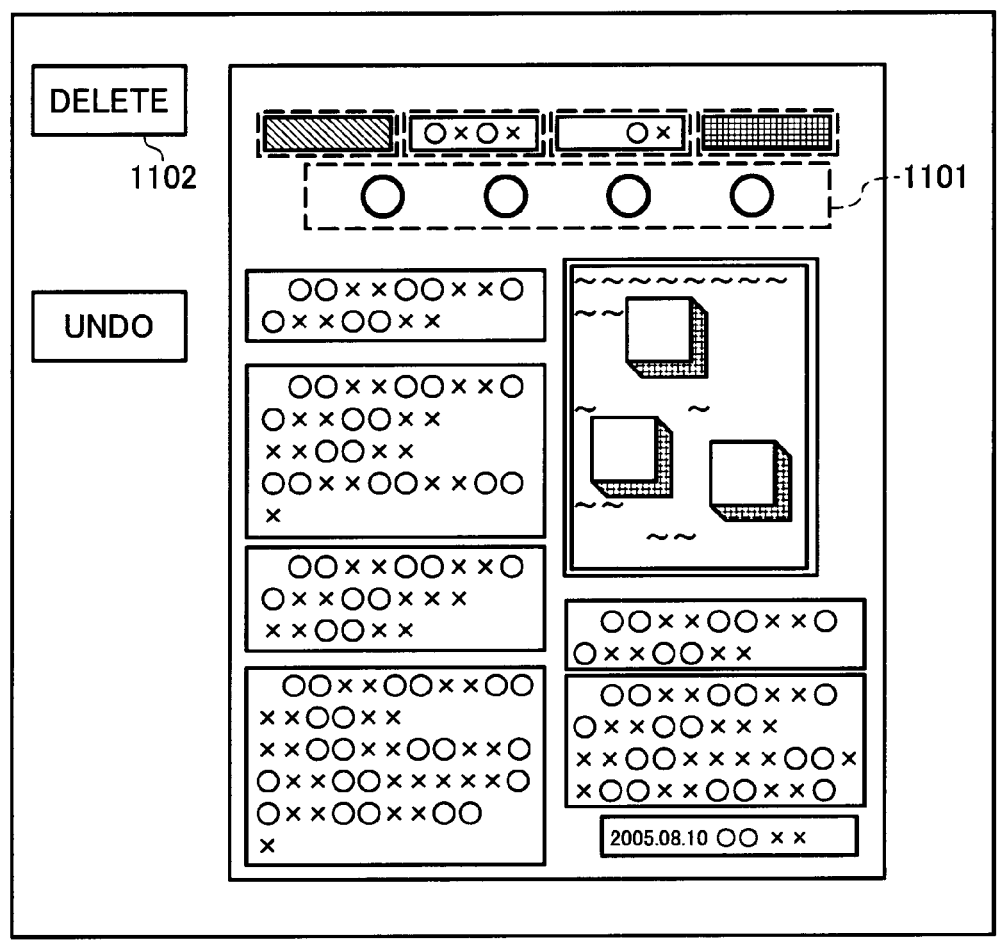
FIG. 10 is a diagram of an example of a divided image in which a block is additionally selected.

FIG. 10 is a diagram of an example of a divided image in which a block is additionally selected. FIG. 11 is a diagram of a data structure of the divided image.

When a block 505 is newly selected (Yes at step S104) in addition to the selected blocks previously specified and displayed on the display screen (step S105), while the previously selected blocks are being selected, the additionally selected block 505 is defined by a bold dotted line in a rectangle frame (represented by the reference numeral 1101). The previously selected blocks 501 to 504 are still defined by a bold dotted line in a rectangle frame.

The specifying section 13 updates SEL_STATUS of the block No. 5 to SEL in data 1200 (represented by the reference numeral 1201). SEL_STATUS of the blocks No. 1 to No. 4 is maintained in SEL.

In this case, when the editing section 14 receives an edit request for deletion, i.e., a delete key 1102 in FIG. 10 is pressed (Yes at step S106), the editing section 14 updates SEL_STATUS of the blocks No. 1 to No. 5 to DEL, and deletes the blocks. The display controlling section 15 displays on the touch panel 3 the image edited by the editing section 14, i.e., the image in which the blocks No. 1 to No. 5 (not shown).

Figure 12:
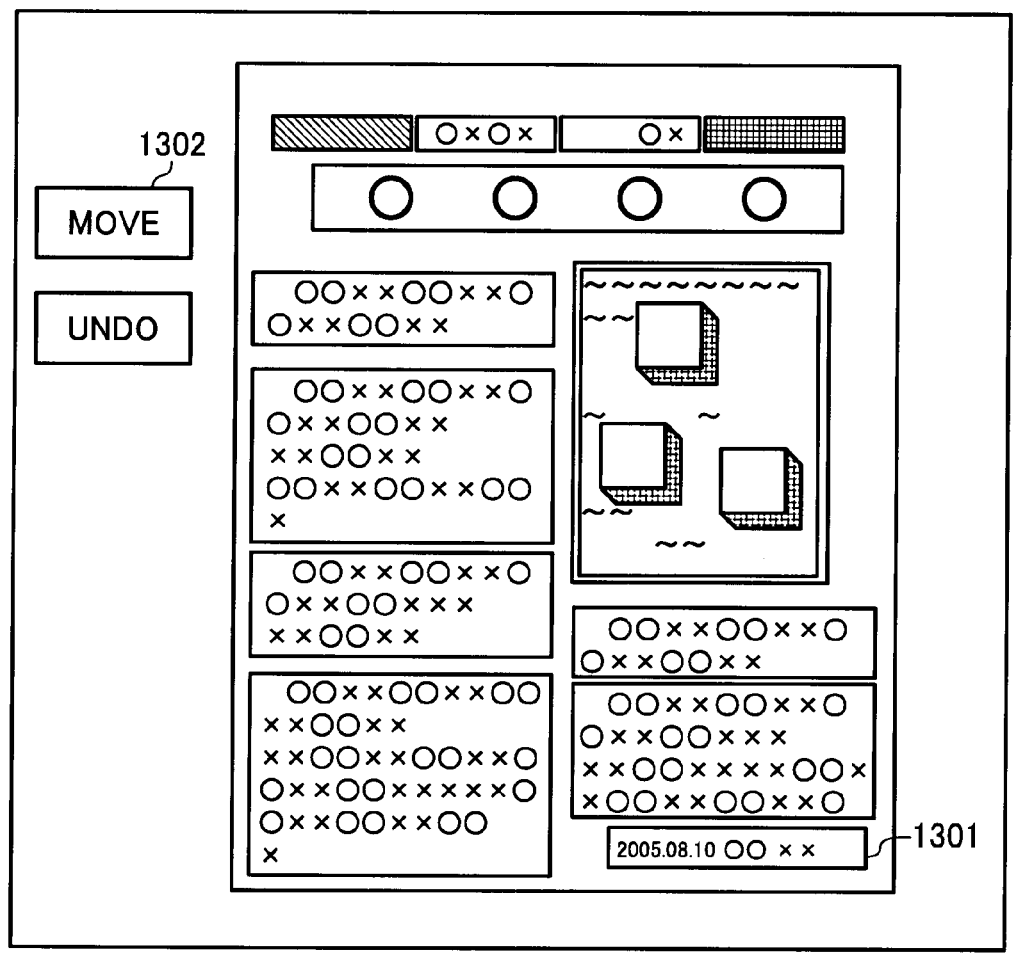
FIG. 12 is a diagram of an example of a divided image in which a block is to be moved.
Figure 14:
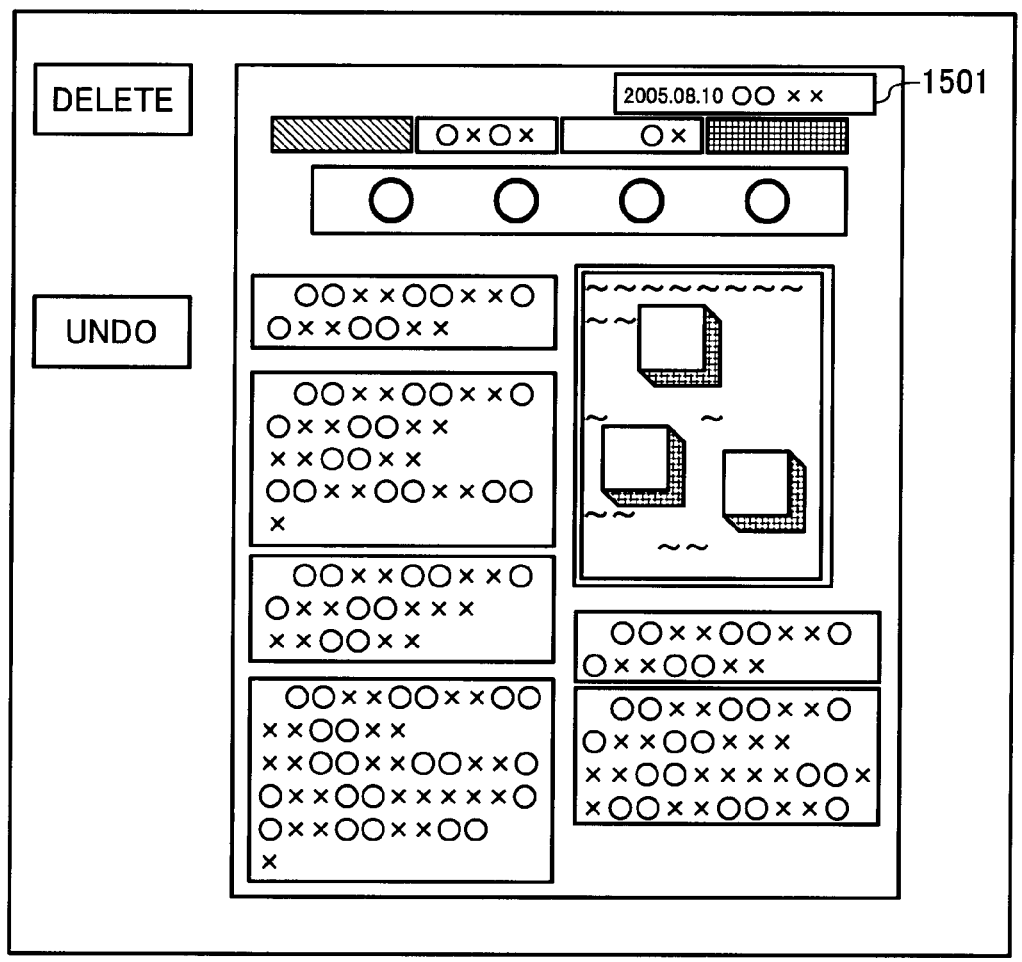
FIG. 14 is a diagram of an example of a divided image in which a block has been moved.

FIG. 12 is a diagram of an example of a divided image in which a block is to be moved. FIG. 13 is a diagram of a data structure of the divided image shown in FIG. 12. FIG. 14 is an example of a divided image in which a block has been moved. FIG. 15 is a diagram of a data structure of the divided image shown in FIG. 14. It is assumed that a user selects a block 1301 in FIG. 12 by touch input on the touch panel 3, and also presses a move key 1302.

The specifying section 13 accepts the touch input on the block 1301, and updates SEL_STATUS of the block 1301 to SEL. The editing section 14 detects the touch input through the move key 1302, and updates AREA of the block 1301. A user inputs information on a move destination in the editing section 14 through the touch panel 3 by, for example, indicating the move destination with his/her finger. The editing section 14 updates AREA of the block 1301 to (50, 3, 35, 6) based on the information on the move destination (represented by the reference numeral 1601), and also updates SEL_STATUS of the block 1301 to NOSEL.

The display controlling section 15 displays a moved block 1501 according to the AREA and SEL_STATUS information updated by the editing section 14.

Figure 16:
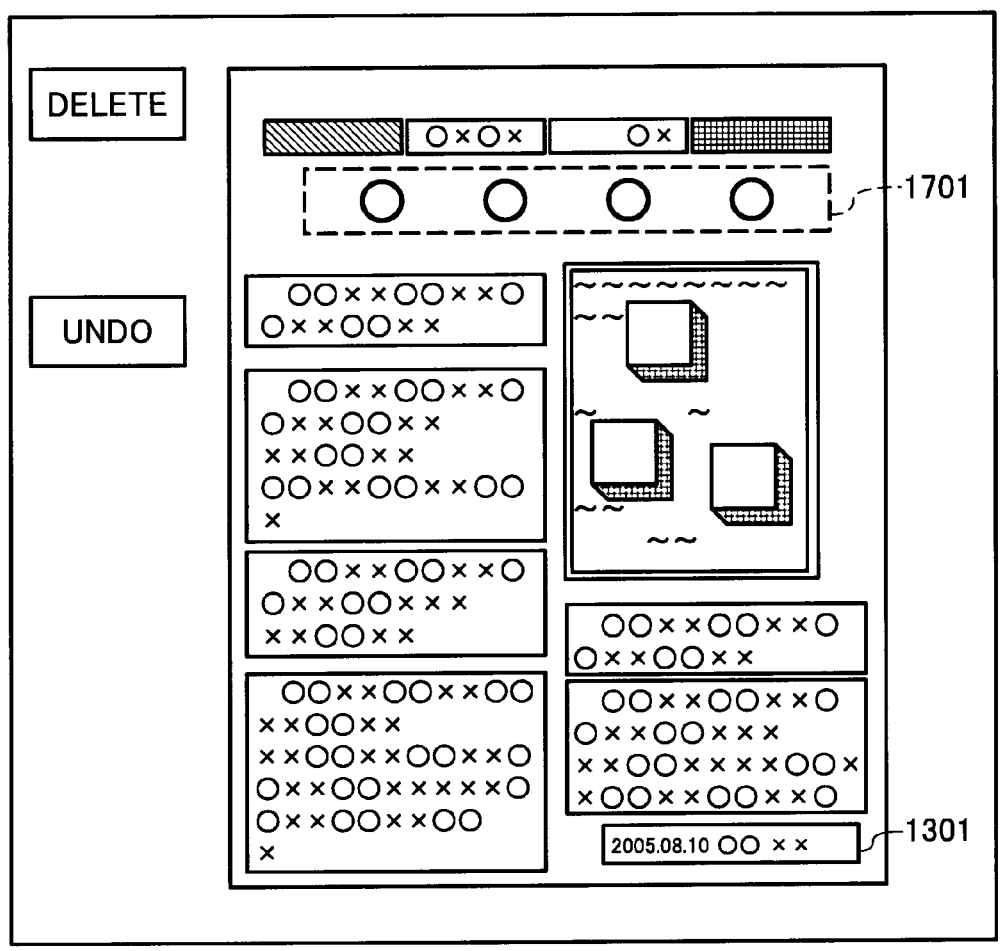
FIG. 16 is a diagram of an example of a divided image in which a block is newly selected.

FIG. 16 is a diagram of an example of a divided image in which a block is newly selected. FIG. 17 is a diagram of a data structure of the divided image. When the specifying section 13 specifies a block as a newly selected block, image data is updated such that blocks other than the newly selected block are in the non-selected status.

It is assumed that the block 505 displayed on the touch panel 3 in FIG. 5 is newly selected. The specifying section 13 specifies the block 505 as a newly selected block, and, as shown in FIG. 17, updates SEL_STATUS of a block 1701 from NOSEL to SEL (represented by the reference numeral 1801), and SEL_STATUS of other blocks to NOSEL.

As described above, according to the first embodiment of the present invention, the image display device 10 analyzes input image data to determine types of images contained in the image data. The image display device 10 then divides the image data into blocks based on the types of images, and displays the image data divided into blocks on the touch panel 3. When a block is selected by touch input via the block and conditions and parameters for editing are set for the block, the selected block is edited according to the conditions and parameters. The image display device 10 displays the edited image. Thus, a user can edit an image by a simple operation while checking the image displayed on the touch panel 3, and set conditions and parameters for the output image. The image forming apparatus including the image display device 10 thereby outputs the edited image.

Figure 18:
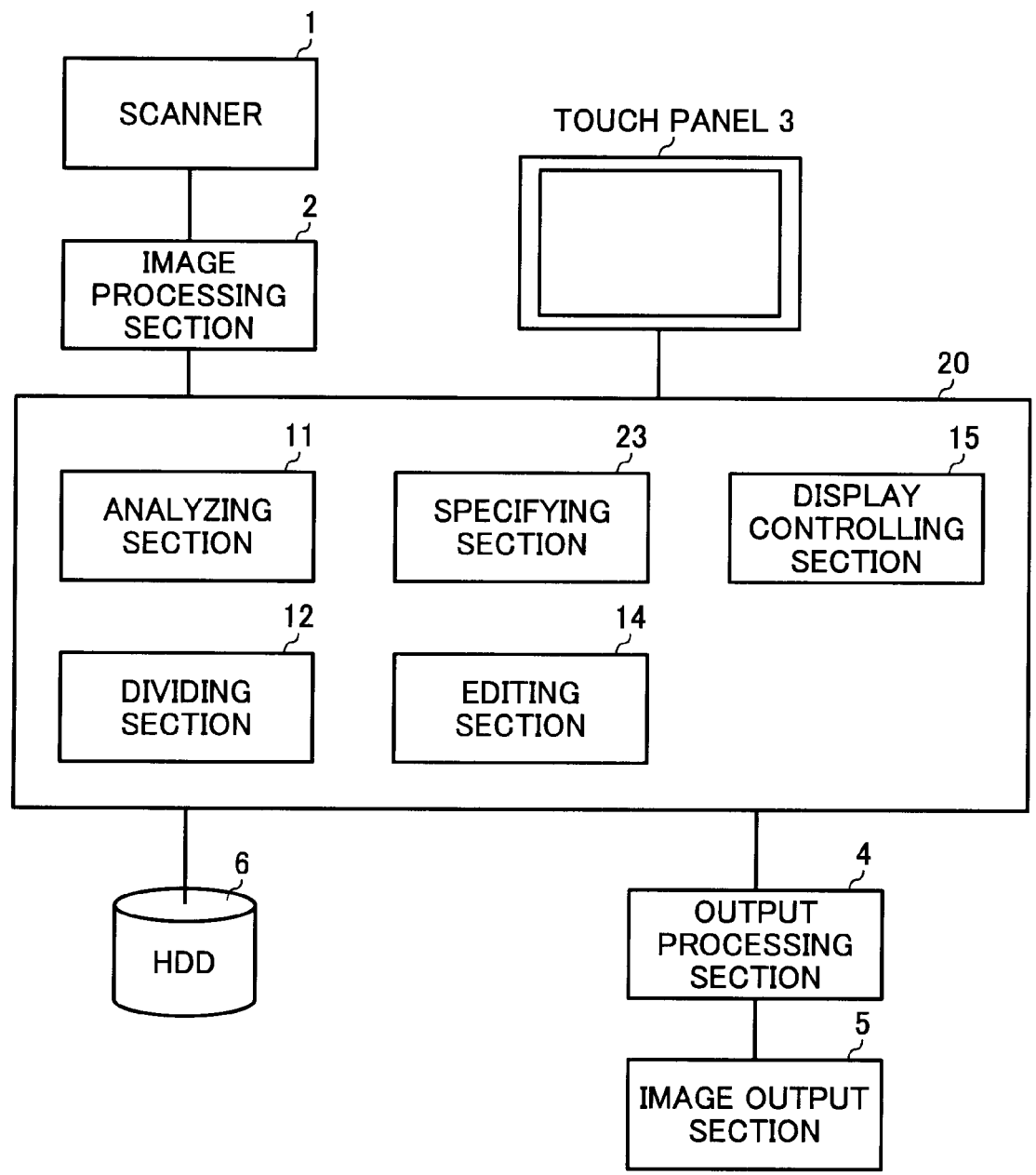
FIG. 18 is a functional block diagram of an image forming apparatus including an image display device according to a second embodiment of the present invention.

FIG. 18 is a functional block diagram of an image forming apparatus including an image display device 20 according to a second embodiment of the present invention. The image display device 20 is basically similar in construction to the image display device 10 except for the presence of a specifying section 23 in place of the specifying section 13. The image display device 20 can cancel the selection of a block that was once selected, and set the block in the non-selected status differently from the image display device 10. Consequently, when having selected a block erroneously or by mistake, a user can cancel the selection of the block, and select a desired block to be edited.

When the user touches any point in a specific block, the specifying section 23 specifies the block as a selected block. On the other hand, if the user touches any point outside blocks displayed on the touch panel 3 when a selected block has already been specified, the specifying section 23 sets the previously selected block in the non-selected status.

The specifying section 23 can detect that the point touched on the touch panel 3 is located outside the blocks. Having detected that the touched point is located outside the blocks when a selected block has already been specified, the specifying section 23 updates SEL_STATUS of the previously selected block to NOSEL. The display controlling section 15 displays this block as in the non-selected status on the touch panel 3 based on SEL_STATUS information updated by the specifying section 23.

When the user touches a new block while touching a point outside the blocks, the specifying section 23 specifies the block where the user touches as a selected block in addition to a previously selected block.

When the user touches a new block and a point outside the blocks at the same time, the specifying section 23 specifies the touched block as a newly selected block, and sets a previously selected block in the non-selected status.

As described above, according to the second embodiment of the present invention, when a block displayed on the touch panel 3 has already been specified as a selected block, selection statuses such as selected and non-selected statuses can be set in various manners by effectively using touch input from outside blocks displayed on the touch panel 3. Thus, an image that is edited by a simple operation can be displayed on the display screen.

Figure 19:
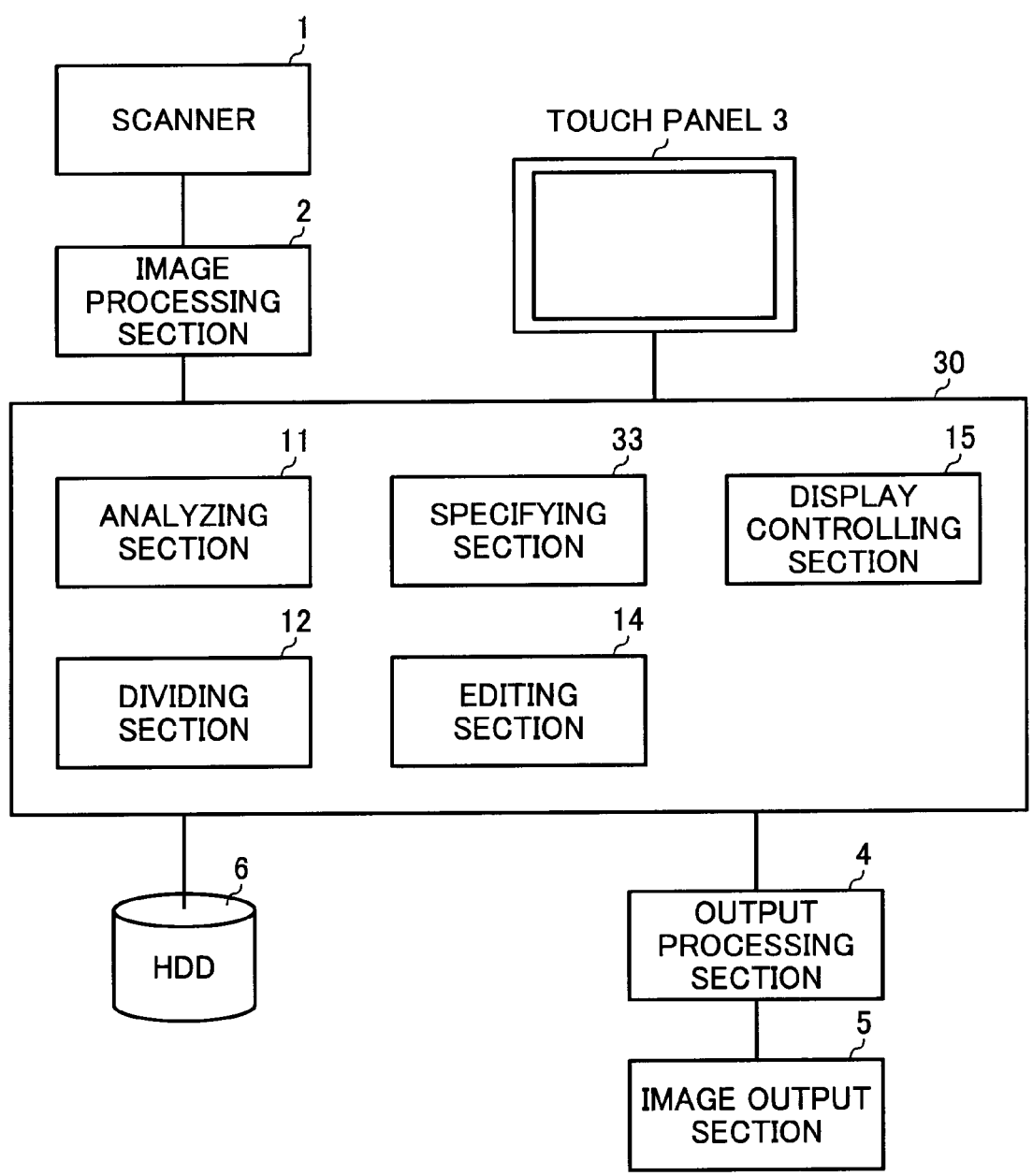
FIG. 19 is a functional block diagram of an image forming apparatus including an image display device according to a third embodiment of the present invention.

FIG. 19 is a functional block diagram of an image forming apparatus including an image display device 30 according to the third embodiment of the present invention. The image display device 30 is basically similar in construction to the image display device 10 except for the presence of a specifying section 33 in place of the specifying section 13. With the image display device 30, a user can set a selection status of a desired block such as selected or non-selected status by touching two or more points in the block in various manners, differently from the image display device 10.

When the user touches a point in a specific block, the specifying section 33 specifies the block as an additionally selected block. On the other hand, if the user touches two or more points in the same block at the same time, the specifying section 33 specifies the block as a newly selected block, and sets a block that has already been selected in the non-selected status. Thus, selected and non-selected statuses can be set by a simple operation.

As another example, when the user touches two or more points in the same block at the same time, the specifying section 33 specifies the block as a selected block in addition to a block that has already been selected. When a user touches a point in a specific block, the specifying section 33 specifies the block as a newly selected block, and sets a block that has already been selected in the non-selected status.

As described above, according to the third embodiment of the present invention, the image display device 30 checks whether a user touches two or more points in a block to determine that the block is additionally or newly selected. That is, the user can set a selection status of a desired block such as selected or non-selected status by touching the block with one or two fingers. Thus, the user can edit an image flexibly by a simple operation while viewing the image on the touch panel 3, and set conditions and parameters for the output image. The image forming apparatus including the image display device 30 thereby outputs the edited image.

Figure 20:
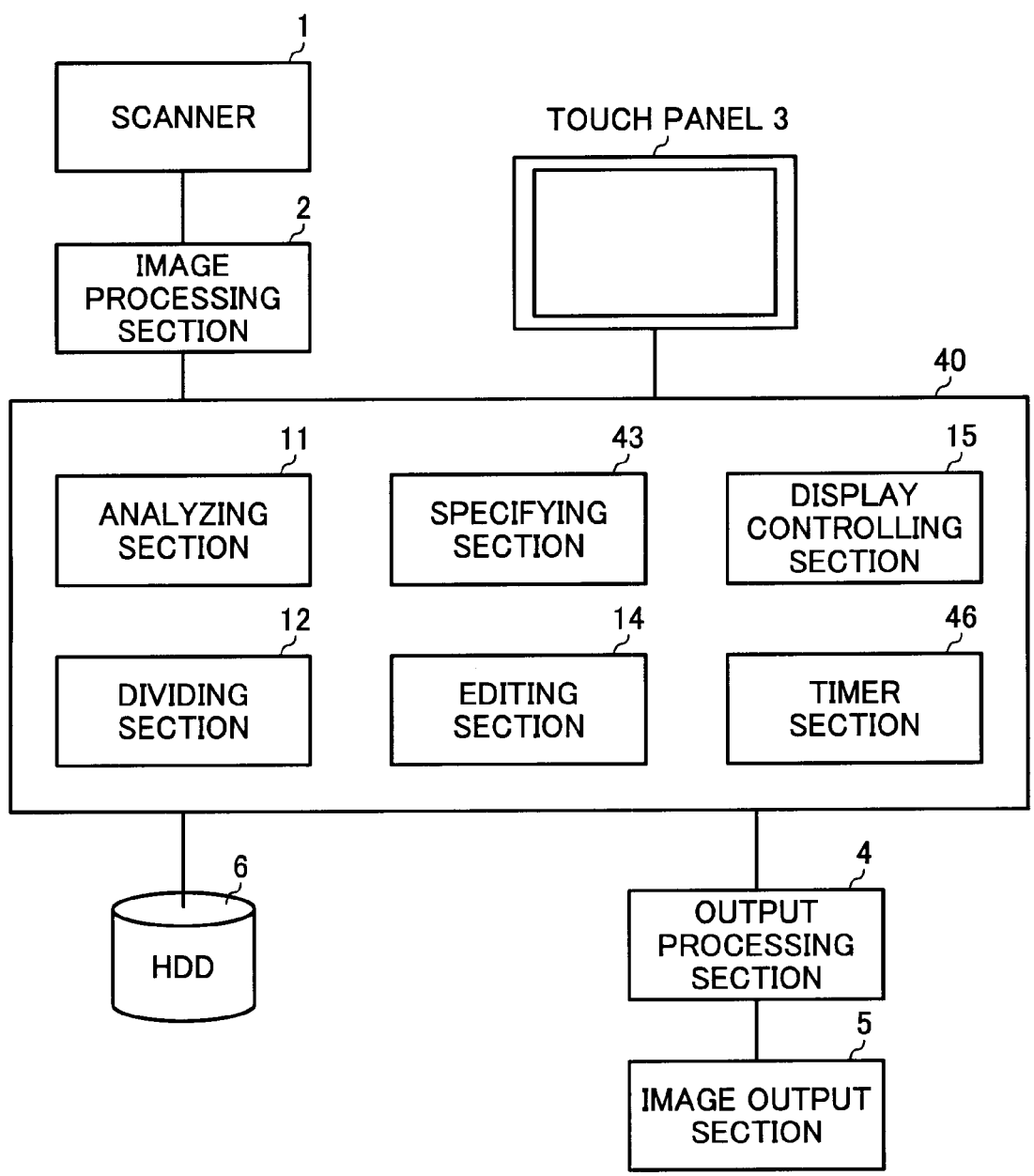
FIG. 20 is a functional block diagram of an image forming apparatus including an image display device according to a fourth embodiment of the present invention.

FIG. 20 is a functional block diagram of an image forming apparatus including an image display device 40 according to the fourth embodiment of the present invention. The image display device 40 is basically similar in construction to the image display device 10 except that the image display device 40 further includes a timer section 46, and a specifying section 43 in place of the specifying section 13. The timer section 46 counts a time interval between a plurality of touch inputs. With the timer section 46, the image display device 40 determines a selection status of a block based on the time interval or the duration of touch input.

The timer section 46 counts a time interval between touch inputs in a block. When the time interval counted by the timer section 46 is less than a predetermined time, the specifying section 43 specifies the block as a newly selected block. When the time interval is not less than the predetermined time, the specifying section 43 specifies the block as an additionally selected block.

Besides, when the time interval is longer than a predetermined time, the specifying section 43 specifies the block as a newly selected block. When the interval is not longer than the predetermined time, the specifying section 43 specifies the block as an additionally selected block.

As another example, when the duration of time the user is continuously touching a block is less than a predetermined time, the specifying section 43 specifies the block as a newly selected block. When the duration of time is not less than a predetermined time, the specifying section 43 specifies the block as an additionally selected block.

On the other hand, when the duration of time is longer than a predetermined time, the specifying section 43 specifies the block as a newly selected block. When the duration of time is not longer than a predetermined time, the specifying section 43 specifies the block as an additionally selected block.

As described above, according to the fourth embodiment of the present invention, the image display device 40 includes the timer section 46 that counts a time interval between a plurality of touch inputs or the duration of time input. Based on the time interval or the duration of touch input, the specifying section 43 determines a selection status of a block, i.e., whether a block is additionally selected or newly selected. That is, a user can set a selection status of a desired block such as selected or non-selected status by touching the block at various time intervals. Thus, the user can edit an image flexibly by a simple operation while viewing the image on the touch panel 3, and set conditions and parameters for the output image. The image forming apparatus including the image display device 40 thereby outputs the edited image.

Figure 21:
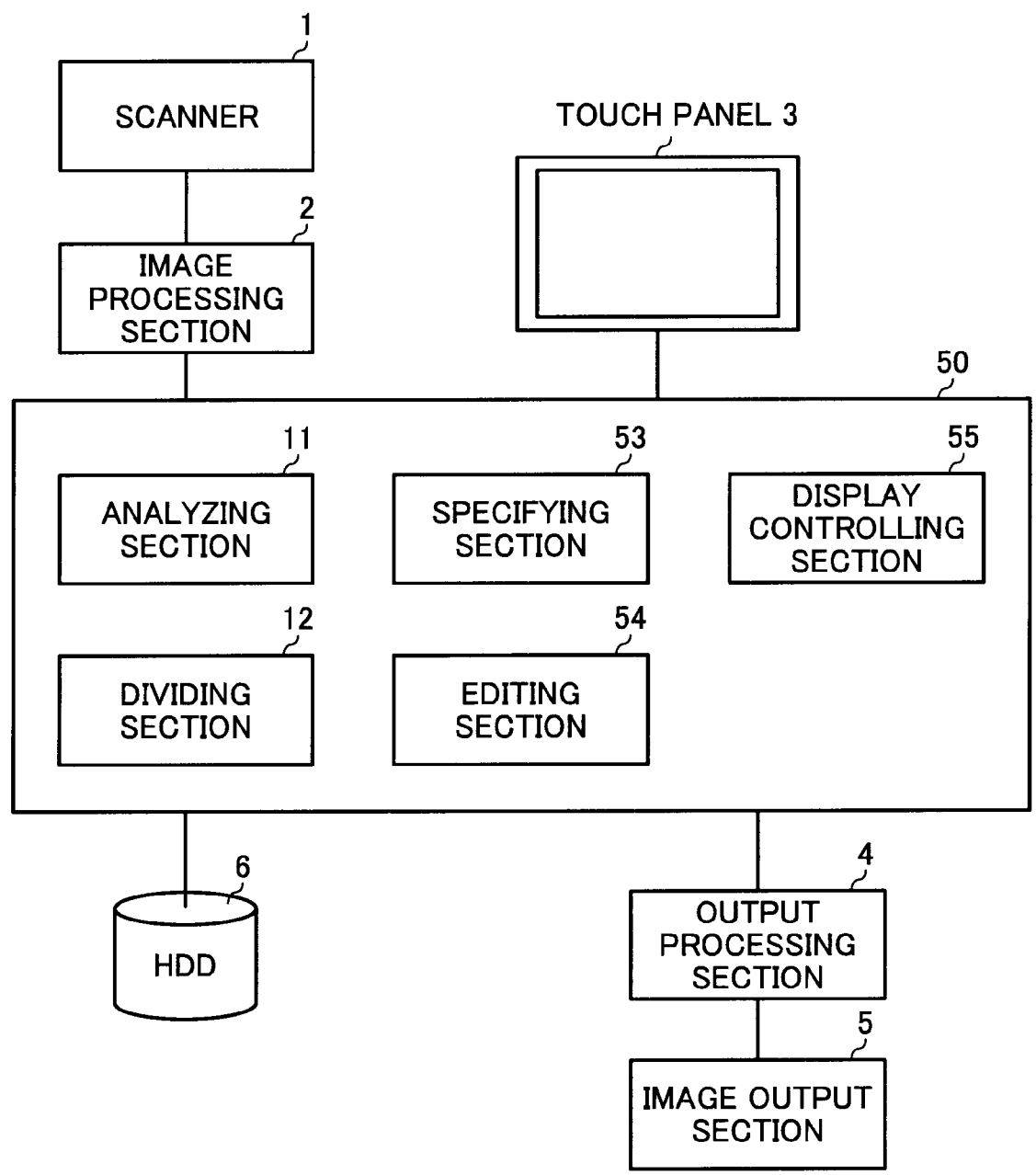
FIG. 21 is a functional block diagram of an image forming apparatus including an image display device according to a fifth embodiment of the present invention.

FIG. 21 is a functional block diagram of an image forming apparatus including an image display device 50 according to the fifth embodiment of the present invention. The image display device 50 includes a specifying section 53, an editing section 54, and a display controlling section 55, in place of the specifying section 13, the editing section 14, and the display controlling section 15 of the image display device 10. When accepting a series of touch inputs through a block, the image display device 50 displays an edit menu on the touch panel 3 so that a user can select a desired item from the edit menu displayed on the touch panel 3.

When the user touches a block which has already been specified as a selected block by the specifying section 53, the display controlling section 55 displays the edit menu on the display screen. The editing section 54 edits the block according to an item selected by the user from the edit menu. Examples of items in the edit menu include delete, move, enlarge and shrink. A pull-down menu can be employed as the edit menu. A desired item is selected and set up by touch input from the edit menu displayed on the display screen.

As another example, when the specifying section 53 accepts a series of touch inputs through a block, the display controlling section 55 displays a menu for specifying a selection status on the touch panel 3 so that the user can select a desired selection status for the block from the menu. That is, when the user touches a block which has already been specified as a selected block, the display controlling section 55 displays the menu for specifying a selection status on the touch panel 3 so that the specifying section 53 can specify the selection status of the block selected by the user from the menu.

As yet another example, at the time the user touches a block displayed on the touch panel 3, the display controlling section 55 displays the edit menu so that the user can select a desired item to edit the block from the edit menu. In other words, when the specifying section 53 accepts touch input via a block, the display controlling section 55 generates edit menu data to display the edit menu on the touch panel 3. The editing section 54 edits the block according to an item selected by the user from the edit menu by touch input.

As yet another example, at the time the user touches a block displayed on the touch panel 3, the display controlling section 55 displays the menu for specifying a selection status so that the user can select a desired selection status for the block from the menu. Specifically, when the specifying section 53 accepts touch input via a block, the display controlling section 55 can generate selection menu data including a new selection, an additional selection, and a selection release to display the menu for specifying a selection status on the touch panel 3. The specifying section 53 specifies the selection status of the block selected by the user from the menu by touch input.

As described above, according to the fifth embodiment of the present invention, when the specifying section 53 accepts touch input through a block displayed on the touch panel 3, the display controlling section 55 displays a menu so that a user can select a desired item from the menu to edit the block or set a selection status of the block by touch input. Thus, the user can edit an image flexibly by a simple operation while viewing the image displayed on the touch panel 3, and set conditions and parameters for the output image. The image forming apparatus including the image display device 50 thereby outputs the edited image.

Figure 22:
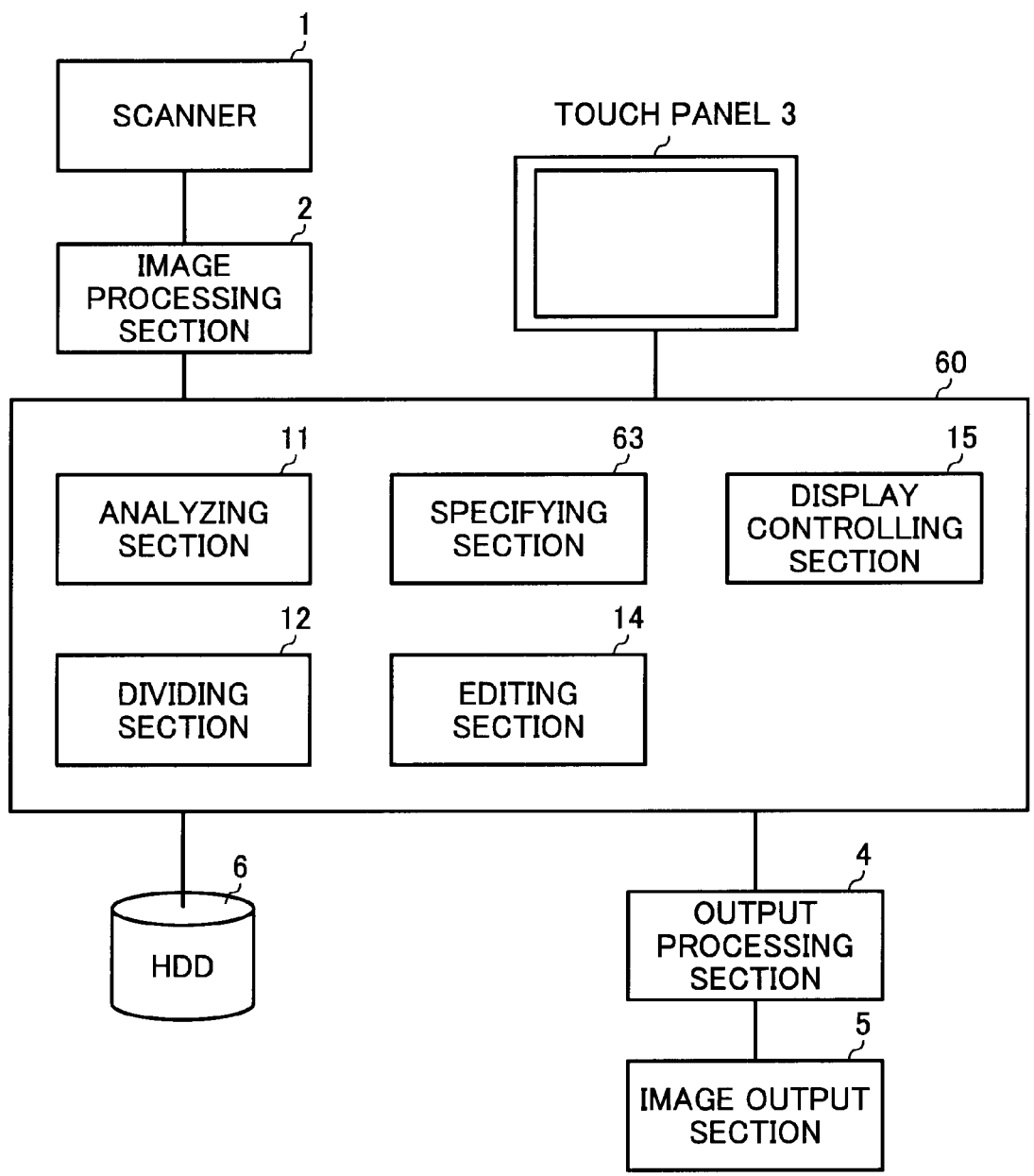
FIG. 22 is a functional block diagram of an image forming apparatus including an image display device according to a sixth embodiment of the present invention.

FIG. 22 is a functional block diagram of an image forming apparatus including an image display device 60 according to the sixth embodiment of the present invention. The image display device 60 is basically similar in construction to the image display device 10 except for the presence of a specifying section 63 in place of the specifying section 13. When accepting a series of touch inputs through a block, the image display device 60 sets the block in the non-selected status, differently from the image display device 10.

When the user touches a block which has already been specified as a selected block by the specifying section 63, the specifying section 63 sets the block in the non-selected status.

According to the sixth embodiment of the present invention, when a user touches a block displayed on the touch panel 3 that has already been specified as a selected block, the specifying section 63 sets the block in the non-selected status. Thus, the user can edit an image flexibly by a simple operation while viewing the image displayed on the touch panel 3, and set conditions and parameters for the output image. The image forming apparatus including the image display device 60 thereby outputs the edited image.

As described above, according to the embodiments of the present invention, the image forming apparatus allow a user to check the print format of an output image on the display screen of the image display device before printing. Moreover, the user can specify a selection status of a block such as newly selected, additionally selected, or non-selected status on the display screen, and edit the selected block. The edited image is displayed on the display screen. Thus, the user can check printing conditions by a simple operation, which improves the usability of the image forming apparatus for the user.

Figure 23:
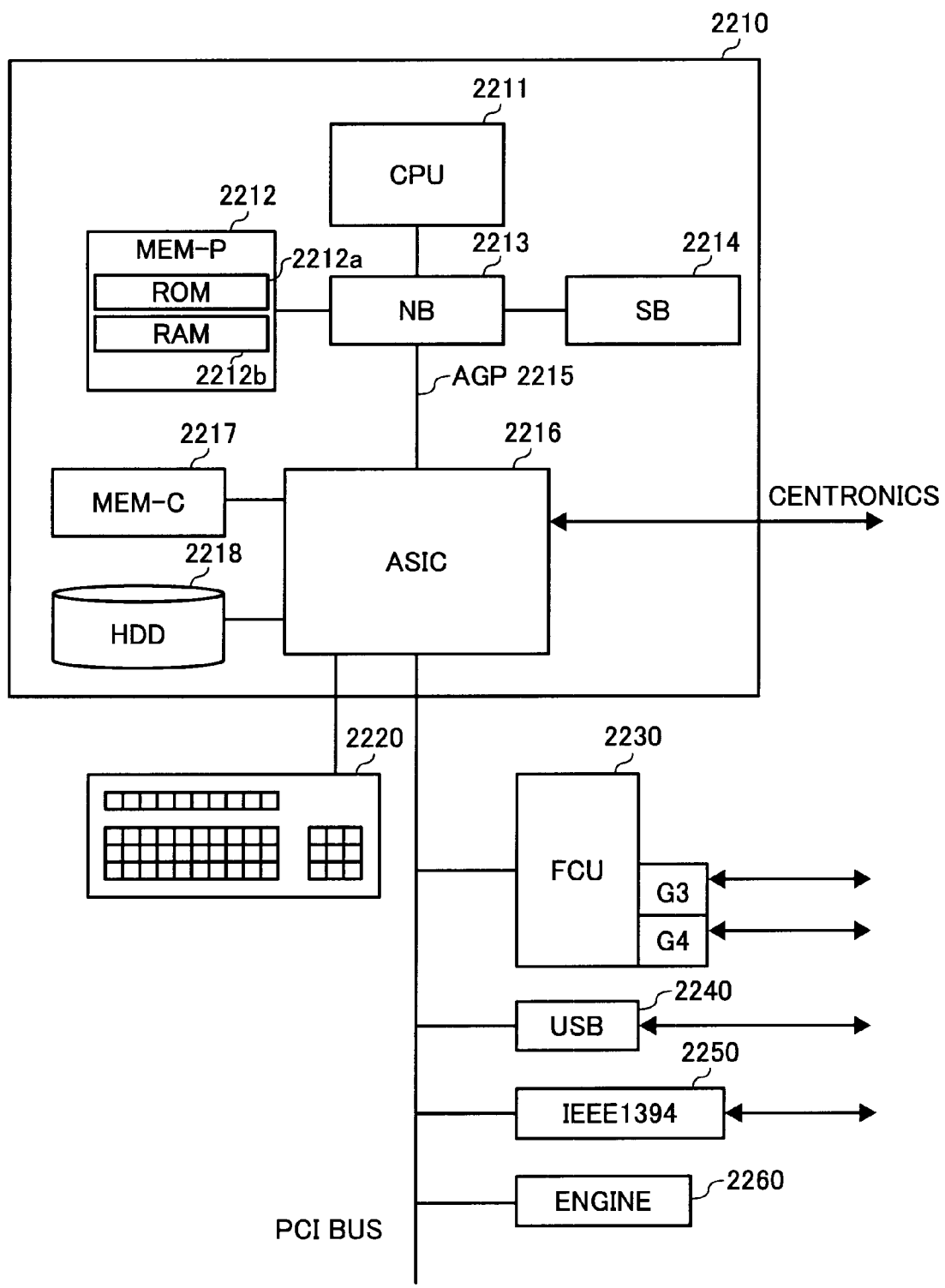
FIG. 23 is a block diagram of a hardware configuration of the image forming apparatus according to the embodiments of the present invention.

FIG. 23 is a block diagram of a hardware configuration of the image forming apparatus according to the embodiments of the present invention. The image forming apparatus is configured as a MFP with multiple functions such as a facsimile and a scanner. As shown in FIG. 23, the MFP includes a controller 2210 and an engine section 2260 connected by a Peripheral Component Interconnect (PCI) bus. The controller 2210 controls the entire MFP, and especially, controls input from a Fan-Coil Unit Interface (FCUI/F) 2230 and an operation displaying section (touch panel) 2220 for displaying and processing an image. The engine section 2260 is an image processing engine, and connectable to the PCI bus. The engine section 2260 performs image processing such as error diffusion and gamma conversion of obtained image data.

The controller 2210 includes a Central Processing Unit (CPU) 2211, a North Bridge (NB) 2213, a system memory (MEM-P) 2212, a South Bridge (SB) 2214, a local memory (MEM-C) 2217, an Application Specific Integrated Circuit (ASIC) 2216, and a Hard Disk Drive (HDD) 2218. The NB 2213 and the ASIC 2216 are connected by an Accelerated Graphics Port (AGP) bus 2215. The MEM-P 2212 includes a Read Only Memory (ROM) 2212a and a Random Access Memory (RAM) 2212b.

The CPU 2211 controls the entire MFP, and is connected to a chipset including the NB 2213, the MEM-P 2212, and the SB 2214. The CPU 2211 is connected to other devices via the chipset.

The NB 2213 is a bridge for connecting the CPU 2211 to the MEM-P 2212, the SB 2214, and the AGP 2215, and includes a memory controller that controls read/write access to the MEM-P 2212, a PCI master, and an AGP target.

The MEM-P 2212 is a system memory for loading and storing programs and data. The ROM 2212a is a read-only memory for storing programs or data. The RAM 2212b is a writable and readable memory for loading programs or data and for image processing.

The SB 2214 is a bridge for connecting the NB 2213 to PCI devices and peripheral devices. The SB 2214 is connected to the NB 2213 via the PCI bus, and the FCUI/F 2230, etc. is also connected to the PCI bus.

The ASIC 2216 is an Integrated Circuit (IC) used for multimedia information processing with hardware components for multimedia information processing, and serves as a bridge for connecting the HDD 2218, the MEM-C 2217, the AGP 2215 and the PCI bus one another.

The ASIC 2216 includes a PCI target, an AGP master, an arbiter (ARB) serving as the core of the ASIC 2216, a memory controller for controlling the MEM-C 2217, and a plurality of Direct Memory Access Controllers (DMAC) for rotating image data by hardware logic. The ASIC 2216 is connected to a Universal Serial Bus (USB) 2240 and the Institute of Electrical and Electronics Engineers (the IEEE) 1394 interface 2250 via the PCI bus.

The MEM-C 2217 is a local memory used as a buffer for images to be transmitted and a code buffer. The HDD 2218 is a storage for storing image data, programs, font data, and form data.

The AGP 2215 is a bus interface for a graphics accelerator card that has been proposed to speed up the graphic processing. The AGP 1308 directly accesses the MEM-P 2212 at high throughput so that the graphics accelerator card operates at high speed.

The ASIC 2216 accepts input from a user through the operation displaying section (touch panel) 2220 connected thereto, and transmits information on the input accepted.

Computer programs (an image display program and an image forming program) executed by the MFP to realize the same function as the image forming apparatus and the image display device according to the embodiments of the present invention are previously stored in a ROM or the like.

The image display program and the image forming program can be recorded, in an installable or executable file format, on a computer-readable recording medium such as a Compact Disc-Read Only Memory (CD-ROM), a Flexible Disk (FD), a Compact Disc-Recordable (CD-R), or a Digital Versatile Disk (DVD).

The image display program and the image forming program can be stored in a computer connected to a network such as the Internet, and downloaded from the computer via the network. The image display program and the image forming program can also be distributed via the network.

The image display program and the image forming program implement the respective components of the image forming apparatus and the image display device, such as the analyzing section 11, the dividing section 12, the specifying section 13, the editing section 14, the display controlling section 15, and the timer section 46. Specifically, the CPU loads the image display program and the image forming program from the ROM into a main storage unit to execute them, thereby implementing the respective components of the image forming apparatus and the image display device.

The present invention is applied to an image forming apparatus including an image display device in the embodiments described above; however, the present invention is not so limited but applicable to various devices with an image display function, for example, electronics devices such as a cellular phone or a digital camera, and an information processor including a Personal Computer (PC). In a case of the PC, for example, a printer driver is installed on the PC. An image to be printed is displayed on a monitor, and can be edited as described in the above embodiments by touch input on the monitor or input using a mouse and a pointer.

As set forth hereinabove, according to an embodiment of the present invention, image data is analyzed and divided into blocks based on types of images contained in the image data. A block to be edited is selected by touch input on a display screen. The selected block is edited in response to an edit request made through the display screen. Thus, the image data can be selectively edited with respect to each block by a simple operation. In addition, an edited image is displayed on the display screen so that a user can edit the image data while visually checking the edited image. This makes editing operation highly efficient.

Moreover, a user can set a selection status of a desired block, such as selected, non-selected, newly selected or additionally selected status, and make an edit request by touching the display screen in various manners. This further improves the efficiency of editing operation.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image display method to cause an image display device to display an image, comprising:
  analyzing, in an analyzing unit, first image data to detect images contained therein, the images including a text image, a photo image, and a graphic image;
  dividing, in a dividing unit, the first image data into a plurality of blocks based on the images to obtain second image data;
  storing, in a storage unit, the plurality of blocks in association with block status data, the block status data including
    coordinates corresponding to the position of each block on a display screen, and
    a selection status corresponding to each block, the selection status being one of selected, non-selected and non-displayed;
  displaying, on the display screen, the second image data;
  specifying, in a specifying unit, at least one of the blocks as a first selected block and updating the selection status for each stored block;
  receiving, on the display screen, an edit request for the first selected block, the edit request containing at least one of commands that include delete, move, enlarge, and shrink;
  editing, in an editing unit, the first selected block in response to the edit request to obtain third image data and updating the block status data based on the edit request;
  displaying, on the display screen, the third image data together with one of the first image data and the second image data;
  detecting a point touched on the display screen; and
  displaying a menu that contains commands including newly select, additionally select, and cancel selection on the display screen when the point is located in a block,
  wherein a selection status of the block is specified based on a command selected from the menu.

2. An image display device, comprising:
  an analyzing unit configured to analyze first image data to detect images contained therein, the images including a text image, a photo image, and a graphic image;
  a dividing unit configured to divide the first image data into a plurality of blocks based on the images to obtain second image data;
  a display screen configured to display the second image data;
  a storage unit configured to store the plurality of blocks in association with block status data, the block status data including
    coordinates corresponding to the position of each block on the display screen, and
    a selection status corresponding to each block, the selection status being one of selected, non-selected and non-displayed;
  a specifying unit configured to specify at least one of the blocks as a first selected block and to update the selection status for each stored block;
  an editing unit configured to
    receive an edit request for the first selected block,
    edit the first selected block in response to the edit request to obtain third image data, the edit request containing at least one of commands that include delete, move, enlarge, and shrink, and
    update the block status data based on the edit request; and
  a display controlling unit configured to
    display the third image data together with one of the first image data and the second image data on the display screen,
    detect a point touched on the display screen, and
    display a menu that contains commands including newly select, additionally select, and cancel selection on the display screen when the point is located in a block,
    wherein a selection status of the block is specified based on a command selected from the menu.

3. A non-transitory computer-readable medium storing computer readable instructions thereon that when executed by an image display device cause the image display device to perform a method comprising:
  analyzing first image data to detect images contained therein, the images including a text image, a photo image, and a graphic image;
  dividing the first image data into a plurality of blocks based on the images to obtain second image data;
  storing the plurality of blocks in association with block status data, the block status data including
    coordinates corresponding to the position of each block on a display screen, and
    a selection status corresponding to each block, the selection status being one of selected, non-selected and non-displayed;
  displaying the second image data;
  specifying at least one of the blocks as a selected block and updating the selection status for each stored block;
  receiving an edit request for the selected block, the edit request containing at least one of commands that include delete, move, enlarge, and shrink;

editing the selected block in response to the edit request to obtain third image data;

updating the block status data based on the edit request;

displaying the third image data together with any one of the first image data and the second image data;

detecting a point touched on the display screen; and displaying a menu that contains commands including newly select, additionally select, and cancel selection on the display screen when the point is located in a block, wherein a selection status of the block is specified based on a command selected from the menu.

* * * * *